UNITED STATES PATENT OFFICE.

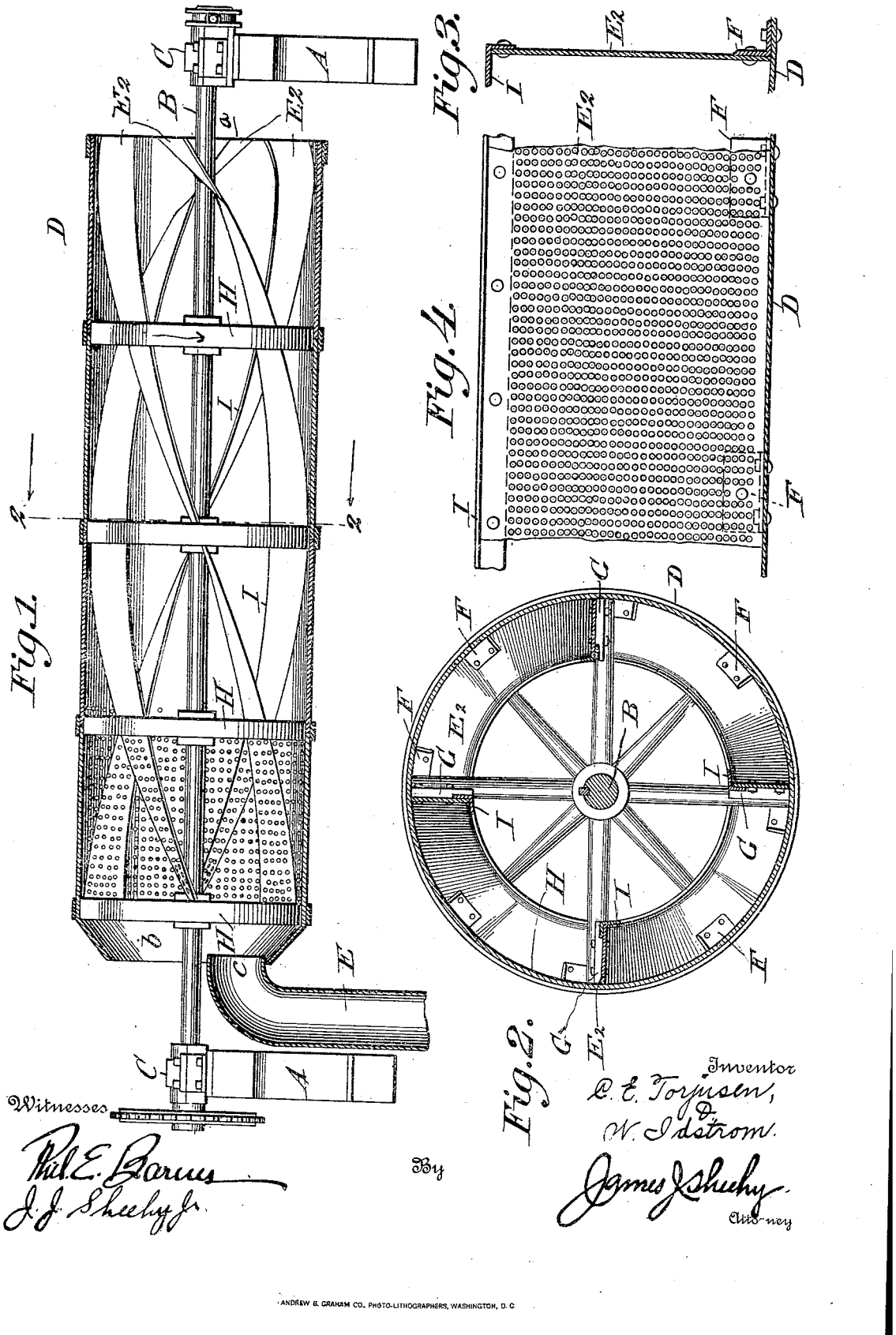

CARSTEN E. TORJUSEN AND WILLIAM IDSTROM, OF NEW ORLEANS, LOUISIANA.

APPARATUS FOR SEPARATING GRAVEL FROM SAND, &c.

958,565. Specification of Letters Patent. Patented May 17, 1910.

Application filed February 28, 1910. Serial No. 546,378.

*To all whom it may concern:*

Be it known that we, CARSTEN E. TORJUSEN and WILLIAM IDSTROM, citizens of the United States, residing at New Orleans, in the parish of Orleans and State of Louisiana, have invented new and useful Improvements in Apparatus for Separating Gravel from Sand, &c., of which the following is a specification.

Our invention pertains to rotary separators; and it has for its object to provide a rotary separator embodying a simple, inexpensive and durable construction whereby it is adapted to expeditiously and thoroughly remove from gravel all sand and earth as well as grit and such pebbles as are smaller than a certain required size.

Our invention will be best understood by reference to the following description when taken in connection with the accompanying illustration of one specific embodiment thereof, while its scope will be more particularly pointed out in the appended claims.

In the drawings which are hereby made a part hereof: Figure 1 is a view, partly in section and partly in elevation, of the separator constituting the best practical embodiment of our invention that we have as yet devised. Fig. 2 is a transverse section taken through the cylindrical shell, the shaft and the blades of the separator, in the plane indicated by the line 2—2 of Fig. 1. Fig. 3 is an enlarged fragmentary section taken through one of the blades and the adjacent portion of the cylindrical shell and showing the manner in which we prefer to connect the blades with the shell. Fig. 4 is an enlarged fragmentary view showing one of the blades in plan.

Similar letters designate corresponding parts in all of the views of the drawings, referring to which:

A A are suitably spaced supports.

B is a shaft journaled in suitable bearings C on said supports, and designed to be rotated by any available motor through the medium of a sprocket belt or other driving connection, and D is a cylindrical shell connected with and carried by the shaft B and forming with the same an essential part of our novel apparatus. The said shell D is open at its end $a$ throughout its diameter, and at its opposite end it is provided with a portion $b$ of truncated cone shape, the purpose of which is to prevent back-wash from the discharge end $c$ of the pipe E, through the medium of which the gravel-bearing earth and water are supplied to the shell. The cylindrical shell is foraminous throughout its length, after the manner shown at the left of Fig. 1, in order to permit the free passage of water, earth, etc., from its interior at points intermediate its ends, and in that way facilitate the separation of all foreign matter from the gravel.

Arranged spirally in the cylindrical shell D and extending longitudinally throughout the length thereof are four equidistant blades $E^2$. These blades extend from the inner side of the shell D inwardly about the proportional distance shown in Fig. 2, and they have for their office to keep the gravel-bearing earth and water in motion, and in that way accelerate the separation of all matter from the gravel of the size desired. It will also be seen by comparison of Figs. 1 and 2 that the pitch of the spiral of each blade is equal to twice the length of the cylinder, and that said pitch is continued to a point about eighteen inches from the discharge end of the shell, at which point the pitch is increased enough to give the blade a steep slant and enable it to accelerate the moving gravel and chute the same through and beyond the discharge end of the cylinder, and further that the curve in the portion of each blade near the discharge end of the cylinder serves as a baffle to prevent gravel from running out of the cylinder other than along the blades. The blades $E^2$ are connected at their outer edges to the shell D through the medium of angle brackets F spaced apart, and the metal of which the blades are formed is cut in such manner as to enable the blades to snugly fit the wall of the shell when the blades are bent into the spiral form shown. It will also be seen by reference to Fig. 2 that the blades $E^2$ rest on and are connected to brackets G carried by the arms of spiders H arranged between and fixedly connected to the shaft B and the shell D at intervals in the length of the latter. The blades in any cross-section similar to Fig. 2 will lie with respect to width in the position shown in said figure, relative to the wall of the cylindrical shell, and the blades are foraminous except at points adjacent their outer and inner edges. It will also be understood from the drawings that the blades are provided at their inner edges with right-angle flanges I, and that said flanges extend forward from the blades with reference to the direction indicated by arrow in which the shell D and the blades E² are rotated. The said flanges I serve the important purpose of keeping the moving gravel on the blades.

In the practical use of the separator a mixture of gravel, sand and water is pumped into the shell D at a point near the end $b$ thereof through the pipe E, and the shell is rotated with the shaft B and the spiders H and blades E² at a low rate of speed, say ten or twelve revolutions per minute. During this operation the water will gravitate through the perforations of the blades and shell and carry with it and out of the shell the sand and grit, while the gravel will be picked up by the blades and caused to travel along the surface thereof until the blade portions of increased pitch are reached, when the movement of the gravel will be accelerated and the same will be chuted through the open end $a$ of the cylinder to a receptacle or chute (not shown) placed to receive the same. We would also have it understood in this connection that when desired the gravel may be delivered from the discharge end $a$ of the shell D to the ground below the said end from whence it can be conveniently removed at intervals.

We prefer in putting our invention into practice, to form the foraminous shell D of a plurality of drums suitably connected together and to the spiders H as shown in Fig. 1, but we do not desire to be understood as limiting ourselves to this or other details or the form or relative arrangement of parts disclosed, inasmuch as modifications may be made in the future practice of the invention without departing from the scope of the same as defined in the claims appended.

Having described our invention, what we claim and desire to secure by Letters-Patent, is:

1. In a separator, the combination of suitably spaced supports, a shaft journaled in suitable bearings on said supports, spiders fixed on said shaft at intervals in the length thereof, a cylindrical shell fixed to said spiders and perforated and having one of its ends open throughout its diameter and also having a truncated cone at its opposite end, a pipe extending through the latter end and into the shell and adapted to deliver material to be separated thereto, and equidistant blades arranged spirally in the shell and extending throughout the length thereof and connected to both spiders and shell and having their portions adjacent the discharge end of the shell of increased pitch and also having right-angle flanges which extend forward from their inner edges; the said blades being provided with perforations, for the purpose set forth.

2. In a separator, the combination of a suitably supported foraminous shell open at one end throughout its diameter and having a truncated cone at its opposite end, a pipe extending through the latter end and into the shell for delivering material to be separated thereto, and equidistant, perforated blades carried by and movable with the shell and arranged spirally in and extending throughout the length thereof and having their portions adjacent the discharge end of the shell of increased pitch and also having right-angle flanges which extend forward from their inner edges.

3. In a separator, the combination of a suitably supported foraminous shell open at one end throughout its diameter and having a truncated cone at its opposite end, a pipe extending through the latter end and into the shell, and equidistant perforated blades carried by and movable with the shell and arranged spirally in and extending throughout the length thereof and having right-angle flanges on their inner edges.

4. In a separator, the combination of a suitably supported foraminous shell open at one end, and equidistant perforated blades carried by and movable with the shell and arranged spirally in and extending lengthwise thereof and having flanges on their inner edges, and means for delivering material to be separated to the interior of the shell through the opposite end thereof.

In testimony whereof we have hereunto set our hands in presence of two subscribing witnesses.

CARSTEN E. TORJUSEN.
WILLIAM IDSTROM.

Witnesses:
GEO. H. KENT,
J. L. WARREN WOODVILLE.